(12) United States Patent
Tanaka et al.

(10) Patent No.: US 11,577,599 B2
(45) Date of Patent: Feb. 14, 2023

(54) VEHICLE

(71) Applicant: Mazda Motor Corporation, Hiroshima (JP)

(72) Inventors: Hiroshi Tanaka, Aki-gun (JP); Satoshi Ueno, Aki-gun (JP); Kei Yonemori, Aki-gun (JP); Wataru Harazawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 112 days.

(21) Appl. No.: 17/345,741

(22) Filed: Jun. 11, 2021

(65) Prior Publication Data
US 2022/0001740 A1 Jan. 6, 2022

(30) Foreign Application Priority Data

Jul. 1, 2020 (JP) .............................. JP2020-113746

(51) Int. Cl.
*B60K 11/02* (2006.01)
*B60K 6/40* (2007.10)
*B60K 6/46* (2007.10)

(52) U.S. Cl.
CPC ................ *B60K 11/02* (2013.01); *B60K 6/40* (2013.01); *B60K 6/46* (2013.01)

(58) Field of Classification Search
CPC . B60K 1/00; B60K 6/485; B60K 6/44; B60K 6/40; B60K 6/405; B60K 11/00; B60K 11/02; B60K 11/04; B60K 6/46; B60K 2001/003; F01D 15/10; F01D 25/12; F01D 25/18; B60Y 2200/92; Y02T 10/62; Y02T 90/14; F01P 2007/146; F01P 2050/24; F01P 3/20; F01P 7/165
See application file for complete search history.

(56) References Cited

U.S. PATENT DOCUMENTS

2019/0229582 A1* 7/2019 Ito ........................... B60K 11/02
2021/0016765 A1 1/2021 Toda et al.

FOREIGN PATENT DOCUMENTS

| CN | 103079860 A | * | 5/2013 | ............. B60K 25/02 |
| CN | 101895172 B | * | 10/2013 | ............... B60K 6/48 |
| JP | 2013013195 A | * | 1/2013 | ............. B60K 11/02 |
| JP | 2013177103 A | * | 9/2013 | |
| JP | 2014088167 A | * | 5/2014 | ............. B60K 11/02 |
| JP | 2017056922 A | * | 3/2017 | |
| JP | 2019149899 A | * | 9/2019 | |
| JP | 2019162964 A | | 9/2019 | |
| WO | WO-2015190523 A1 | * | 12/2015 | ............... B60K 1/00 |

* cited by examiner

*Primary Examiner* — George C Jin
*Assistant Examiner* — Teuta B Holbrook
(74) *Attorney, Agent, or Firm* — Alleman Hall Creasman & Tuttle LLP

(57) ABSTRACT

To provide a vehicle, vehicle motion performance of which can be made high by downsizing a drive unit having an engine and a motor. A drive unit for vehicle travel has the engine and the motor. The motor is arranged adjacent to a rear side of the engine. In a housing of the motor, parts of oil control valves and motor cooling oil paths, through each of which motor cooling oil flows, are provided. The motor cooling oil flowing through first motor cooling oil paths exchanges heat with engine oil in a first heat exchanger. The motor cooling oil flowing through second motor cooling oil paths exchanges heat with an engine cooling coolant in a second heat exchanger.

20 Claims, 9 Drawing Sheets

VEHICLE

TECHNICAL FIELD

The present invention relates to a vehicle and, in particular, to a cooling structure of a drive unit that has an engine and a motor.

BACKGROUND ART

In recent years, for purposes of reducing an environmental load and the like, hybrid vehicles including a motor in addition to an engine as drive sources of vehicle travel have been widespread.

In Patent Document 1, an automobile that includes an engine and a motor as drive sources for travel is disclosed. In the automobile disclosed in Patent Document 1, both of the engine and the motor, which are provided as the drive sources for the travel, are mounted in a front area.

The automobile disclosed in Patent Document 1 can be switched between an engine-drive mode in which the automobile travels by using the engine and a motor-drive mode in which the automobile travels by using the motor. When a driver selects the motor-drive mode, the automobile is driven by the motor.

Meanwhile, when the driver selects the engine-drive mode, the motor implements a torque assist function at a start of the automobile, and the automobile is driven by the engine at a specified vehicle speed or higher.

PRIOR ART DOCUMENTS

Patent Documents

Patent Document 1: JP2019-162964A

SUMMARY OF THE INVENTION

Problem to be Solved by the Invention

Further improvement in vehicle motion performance has been requested for the hybrid vehicle as described above. When attempting to improve the vehicle motion performance, it is beneficial to arrange the drive unit, which includes the engine and the motor, in an area near a center of the vehicle. By arranging the drive unit just as described, the vehicle can easily turn, and the vehicle motion performance can be improved.

However, since an occupant space is provided in the area near the center of the vehicle, a mounting space for the drive unit is limited therein. Thus, downsizing of the drive unit is required to arrange the drive unit in the area near the center of the vehicle for the purpose of improving the vehicle motion performance. In addition, the motor is a heat generation member that generates heat when being driven. Thus, in the hybrid vehicle, motor cooling means has to be provided in addition to engine cooling means. For this reason, a configuration including not only the drive unit but also the cooling means has to be downsized.

The present invention has been made to solve the problem as described above, and therefore has a purpose of providing a vehicle, vehicle motion performance of which can be made high by downsizing a drive unit having an engine and a motor.

Means for Solving the Problem

By the way, a heat generation amount of the motor varies by use status of the motor, or the like. When a temperature of the motor is increased to be equal to or higher than a specified temperature, such a problem occurs that a magnetic force of a magnet provided to the motor is reduced or degraded.

For adoption of the motor as a drive source of the vehicle travel, the present inventors considered a structure in which a plurality of motor cooling means, cooling performance of which differed from each other, was provided and which could switch among the plurality of the motor cooling means depending on the use status of the motor, or the like. More specifically, the present inventors considered a structure in which a plurality of the cooling paths, through each of which a refrigerant for cooling the motor flowed, was provided and a switch unit for switching among the plurality of the cooling paths was provided. In this structure, in the case where the cooling performance of the motor differs by the cooling path, the motor can be maintained at an appropriate temperature regardless of the use status of the motor.

However, an attachment position of the switch unit for the drive unit, which has the engine and the motor, is an important factor for improving the vehicle motion performance. That is, in the case where the switch unit is provided in alignment with the drive unit in a vertical direction, size of a set configuration including the drive unit and the switch unit in the vertical direction is increased.

Meanwhile, in the case where the switch unit is attached to the drive unit longitudinally (a portion on any side in an extending direction of an output shaft), in addition to an increase in the longitudinal size of the set configuration as similar to the above, vertical displacement of the set configuration is increased during driving of the drive unit. A reason why the vertical displacement is increased when the switch unit is attached to the drive unit longitudinally is because a distance from a drive wheel to an end of the set configuration is increased. That is, when the drive unit is driven upon travel of the vehicle, the drive unit vibrates vertically with the drive wheel being a point of origin. Meanwhile, in the case where the switch unit is attached to the drive unit longitudinally, the distance from the drive wheel to the end of the set configuration is increased, and the vertical displacement of the set configuration by the vibration is increased.

Just as described, the present inventors considered that the vehicle motion performance is degraded depending on the attachment position of the switch unit to the drive unit.

In view of the above, a vehicle according to an aspect of the present invention has:

a drive unit that is a drive source for travel of the vehicle and includes an engine and a motor arranged adjacent to each other;

a motor cooling path that is connected to the motor and is a path of a refrigerant for cooling the motor and that has: a first motor cooling path; and a second motor cooling path, a cooling performance of which by the refrigerant is higher than that of the first motor cooling path; and a switch unit that is connected to both of the first motor cooling path and the second motor cooling path and switches between cooling of the motor by causing the refrigerant to flow through the first motor cooling path and cooling of the motor by causing the refrigerant to flow through the second motor cooling path. The motor has a housing that accommodates a rotor-and-stator for outputting rotary power, and at least a part of the switch unit and the motor cooling path are provided in the housing.

In the vehicle according to the above aspect, the motor cooling path having the first motor cooling path and the second motor cooling path are provided, and the path can be switched by the switch unit. Accordingly, even in the case where a heat generation amount fluctuates according to a use status of the motor, the motor can be maintained at an appropriate temperature by switching between a mode in which the refrigerant flows through the first motor cooling path to cool the motor and a mode in which the refrigerant flows through the second motor cooling path to cool the motor.

In addition, in the vehicle according to the above aspect, the drive unit, in which the engine and the motor are arranged adjacent to each other, is adopted. In this way, compared to a drive unit in which the engine and the motor are arranged in a separated state, it is possible to downsize the drive unit itself. Therefore, in the vehicle according to the above aspect, it is possible to arrange the drive unit in an area near a center of the vehicle and to achieve high motion performance.

Furthermore, in the vehicle according to the above aspect, at least the part of the switch unit and the motor cooling path are provided in the housing. Thus, compared to a case where the switch unit and the like are provided on the outside of the drive unit, it is possible to suppress an increase in size of the drive unit. Moreover, in the vehicle according to the above aspect, the switch unit and the like are provided in the housing as one of components of the drive unit. Thus, compared to a case where the switch unit is attached to the drive unit in a manner to be projected to one side in an adjacent direction of the engine and the motor (an extending direction of an output shaft), it is possible to prevent an increase in size of a set configuration including the drive unit and the switch unit. Therefore, it is possible to suppress vibration (displacement in a vertical direction) with a drive wheel being a point of origin during driving of the drive unit.

In the vehicle according to the above aspect, the refrigerant may be oil, and the switch unit may be a switch valve.

The oil that is adopted as the refrigerant for cooling the motor in the above configuration has a higher heat exchange rate than a coolant. Thus, in the above configuration, the motor can be cooled with high responsiveness, and the motor can be maintained at the appropriate temperature regardless of the use status of the motor.

In the vehicle according to the above aspect, in the drive unit, the motor may be arranged adjacent to a rear side of the engine in a longitudinal direction of the vehicle, an output shaft of the drive unit may be formed to extend from the engine toward the rear side, the switch unit may have a first switch unit and a second switch unit, and the first switch unit and the second switch unit may be arranged above an axis of the output shaft of the drive unit in a vertical direction of the vehicle in a state of being separated to right and left in a vehicle width direction of the vehicle.

In the case where the first switch unit and the second switch unit are arranged to be separated to the right and left as in the above configuration, compared to a case where the first switch unit and the second switch unit are collectively arranged to one of the right and left sides, there is no need to partially or entirely enlarge the housing. Thus, in the case where the above configuration is adopted, it is possible to suppress the enlargement of the entire set configuration having the drive unit, the switch unit, and the like.

In the vehicle according to the above aspect, the first switch unit and the second switch unit may be arranged at different height positions in the vertical direction of the vehicle.

The first switch unit and the second switch unit can also be arranged at the same height level in the vertical direction. However, in such a case where another member is disposed above or below at least one of the switch units, it is also possible to adopt a configuration that the height level of the first switch unit differs from that of the second switch unit. In this way, it is possible to attach the compact switch unit to the drive unit while interference with surrounding members is avoided.

In the vehicle according to the above aspect, when the engine, the first switch unit, and the second switch unit are seen from the rear side, the first switch unit and the second switch unit may be arranged on an inner side of an outer circumference of the engine.

When both of the first switch unit and the second switch unit are arranged on the inner side of the outer circumference of the engine as in the above configuration, it is possible to further suppress the interference of the set configuration including the drive unit, the switch unit, and the like with the other member therearound.

The vehicle according to the above aspect may further include an ebullient cooler having: a circulation path for circulating an ebullient cooling refrigerant, a boiling point of which is lower than that of the refrigerant flowing through the motor cooling path; an ebullient section that is disposed in the middle of the circulation path and in which the refrigerant and the ebullient cooling refrigerant exchange heat; and a condensation section that condenses the ebullient cooling refrigerant.

As described above, in addition to the motor cooling path having the first motor cooling path and the second motor cooling path, the ebullient cooler with a high cooling capacity is provided for cooling the motor. In this way, the motor can sufficiently be cooled even without a motor cooling path of an excessively large size. Thus, in the case where the above configuration is adopted, the motor can be maintained at the appropriate temperature even when the motor is driven to generate a high output or is continuously driven for a long time.

In the vehicle according to the above aspect, the condensation section in the ebullient cooler may be arranged adjacent to a rear side of the motor in the longitudinal direction of the vehicle.

As described above, when the condensation section of the ebullient cooler is arranged on the rear side of the motor, it is possible to suppress heat (exhaust heat), which is released to the outside during condensation of the ebullient cooling refrigerant, from being transferred to the motor. This is further effective to maintain the motor at the appropriate temperature.

The vehicle according to the above aspect may further include: an engine oil path as a path of engine oil for cooling the engine; a coolant path as a path of a coolant for cooling the engine; a first heat exchanger by which the engine oil flowing through the engine oil path and the refrigerant flowing through the first motor cooling path exchange heat; and a second heat exchanger by which the coolant flowing through the coolant path and the refrigerant flowing through the second motor cooling path exchanging heat.

As described above, in the case where the engine oil and the motor cooling refrigerant can exchange heat in the first heat exchanger and the coolant and the motor cooling refrigerant can exchange heat in the second heat exchanger, the configuration for cooling the engine can also be used as a configuration for cooling the motor. Thus, when the above configuration is adopted, compared to a case where cooling means is separately provided for each of the engine and the motor, it is possible to downsize the drive unit and the cooling means associated therewith. In this way, when the above configuration is adopted, it is possible to downsize the set configuration in which the cooling means is provided to the drive unit and to arrange such a set configuration in the area near the center of the vehicle. Thus, it is possible to arrange a center of gravity of the vehicle at the center of or near the vehicle, and thus to further improve vehicle motion performance.

The vehicle according to the above aspect may further include: an engine coolant temperature sensor for detecting a temperature of the engine; and a controller for controlling the switch unit on the basis of the temperature of the engine.

As described above, in the case where switching control of the switch unit is based on the temperature of the engine, the motor is optimally cooled by using the same cooling means for the engine and the motor. For example, in the case where the temperature of the engine is lower than a specified temperature, the motor is cooled by transferring the heat thereof to the engine oil. In the case where the temperature of the engine is equal to or higher than the specified temperature, the motor can be cooled by transferring the heat thereof to the coolant. The vehicle has a radiator for cooling the coolant, and the radiator includes a radiator fan. Thus, even when the temperature of the engine becomes high, the motor can be maintained at the appropriate temperature.

In the case where the temperature of the engine is lower than the specified temperature, the temperature of the engine can be increased by transferring the heat of the motor to the engine via the engine oil. Thus, it is possible to improve efficiency of the engine at the time of shifting to the vehicle travel by using the engine (an engine-drive mode).

In the vehicle according to the above aspect, an end surface of the housing of the motor in an adjacent direction of the engine and the motor may be covered with a cover member.

As described above, in the case where such a configuration that the end surface of the housing of the motor is covered with the cover member is adopted, the switch unit is covered with the cover member even when the switch unit is partially exposed to the outside of the housing of the motor. Therefore, it is possible to suppress application of an external force to the switch unit, and this is advantageous to secure high safety.

Advantage of the Invention

In regard to the vehicle according to each of the above aspects, it is possible to achieve the high motion performance of the vehicle by downsizing the drive unit that has the engine and the motor.

MODES FOR CARRYING OUT THE INVENTION

Figure 1:
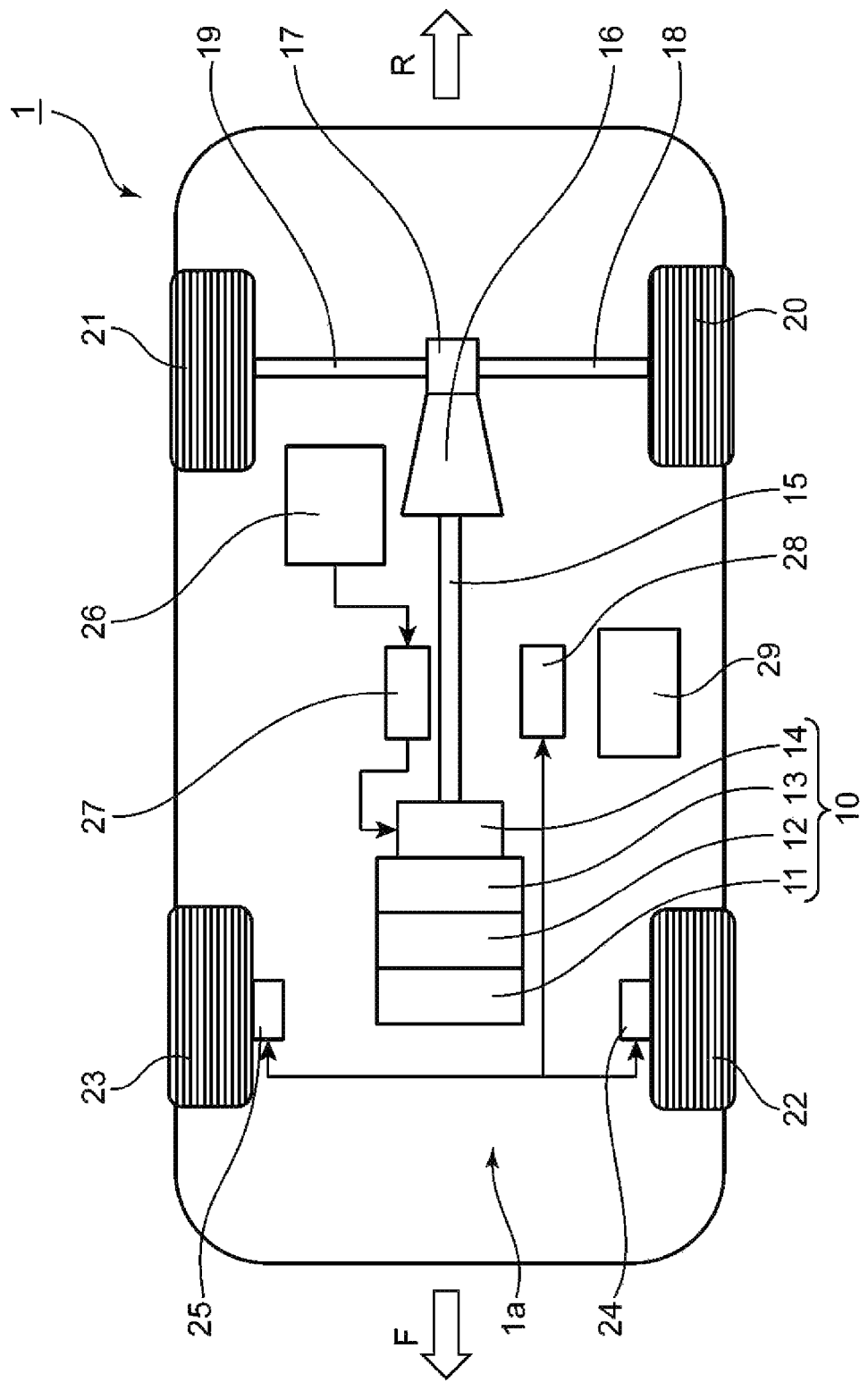
FIG. 1 is a schematic view illustrating an outline configuration of a vehicle according to an embodiment.

A description will hereinafter be made on an embodiment of the present invention with reference to the drawings. The embodiment, which will be described below, merely constitutes an example of the present invention, and the present invention is not limited to the following embodiment in any respect except for an essential configuration thereof.

In the drawings used in the following description, "F," "R," "U," "L," "Le," and "Ri" respectively indicate a front side of a vehicle, a rear side of the vehicle, an upper side of the vehicle, a lower side of the vehicle, a left side of the vehicle, and a right side of the vehicle.

EMBODIMENT

1. Schematic Configuration of Vehicle 1

A description will be made on a schematic configuration of a vehicle 1 according to this embodiment with reference to FIG. 1.

As illustrated in FIG. 1, in the vehicle 1, a drive unit 10 for driving the vehicle 1 is mounted to a rear portion in a front area 1a. The drive unit 10 includes engines 11 to 13 and a motor 14. A detailed structure of the drive unit 10 will be described below.

A propeller shaft 15 is connected to an output shaft of the drive unit 10. The propeller shaft 15 extends rearward at a center in a vehicle width direction of the vehicle 1. A rear end of the propeller shaft 15 is connected to a transmission 16.

A differential gear 17 is connected to the transmission 16. Driveshafts 18, 19 are respectively coupled to left and right portions of the differential gear 17 in the vehicle width direction. The driveshafts 18, 19 are connected to rear wheels 20, 21, respectively. That is, in the vehicle 1 according to this embodiment, the rear wheels 20, 21 are driven for travel by drive power that is generated by the drive unit 10 mounted in the front area 1a.

In the vehicle 1, motors 24, 25 are respectively connected to front wheels 22, 23. Although not illustrated in detail, the motors 24, 25 are so-called in-wheel motors. The motors 24, 25 function as assist motors that generate power at a start of the vehicle 1 and transmit the power to the front wheels 22, 23, respectively. The motors 24, 25 also function as regenerative brakes, each of which generates electricity during deceleration of the vehicle 1. The electricity, which is generated by the motors 24, 25 during the deceleration of the vehicle 1, is stored in a capacitor 28 and the like.

A battery 26 and an inverter 27 are also mounted to the vehicle 1. The battery 26 is an electricity storage module for supplying the electricity to the motor 14 of the drive unit 10. The battery 26 according to this embodiment is a lithium-ion battery, for example. The electricity from the battery 26 is supplied to the motor 14 via the inverter 27.

Here, the vehicle 1 according to this embodiment includes, as drive modes of the drive unit 10, an engine-drive mode and a motor-drive mode. The engine-drive mode is a mode in which the rear wheels 20, 21 are driven by the drive power output from the engines 11 to 13 and the vehicle 1 thereby travels. The motor-drive mode is a mode in which the rear wheels 20, 21 are driven by the drive power output from the motor 14 and the vehicle 1 thereby travels.

The vehicle 1 is configured that the motor 14 does not generate the drive power at the time of driving in the engine-drive mode and the engines 11 to 13 do not generate the drive power at the time of driving in the motor-drive mode.

In the vehicle 1, a drive mode control unit 29 executes switching control between the engine-drive mode and the motor-drive mode. The drive mode control unit 29 is configured to include a microcomputer that has a processor (i.e., a central processing unit (CPU)), memory (i.e., ROM and/or RAM), and the like. The drive mode control unit 29 executes drive mode control on the basis of an instruction from a driver, a situation of the vehicle 1 (a vehicle speed, acceleration/deceleration, a battery remaining amount), and the like.

2. Mounting Position of Drive Unit 10

Figure 2:
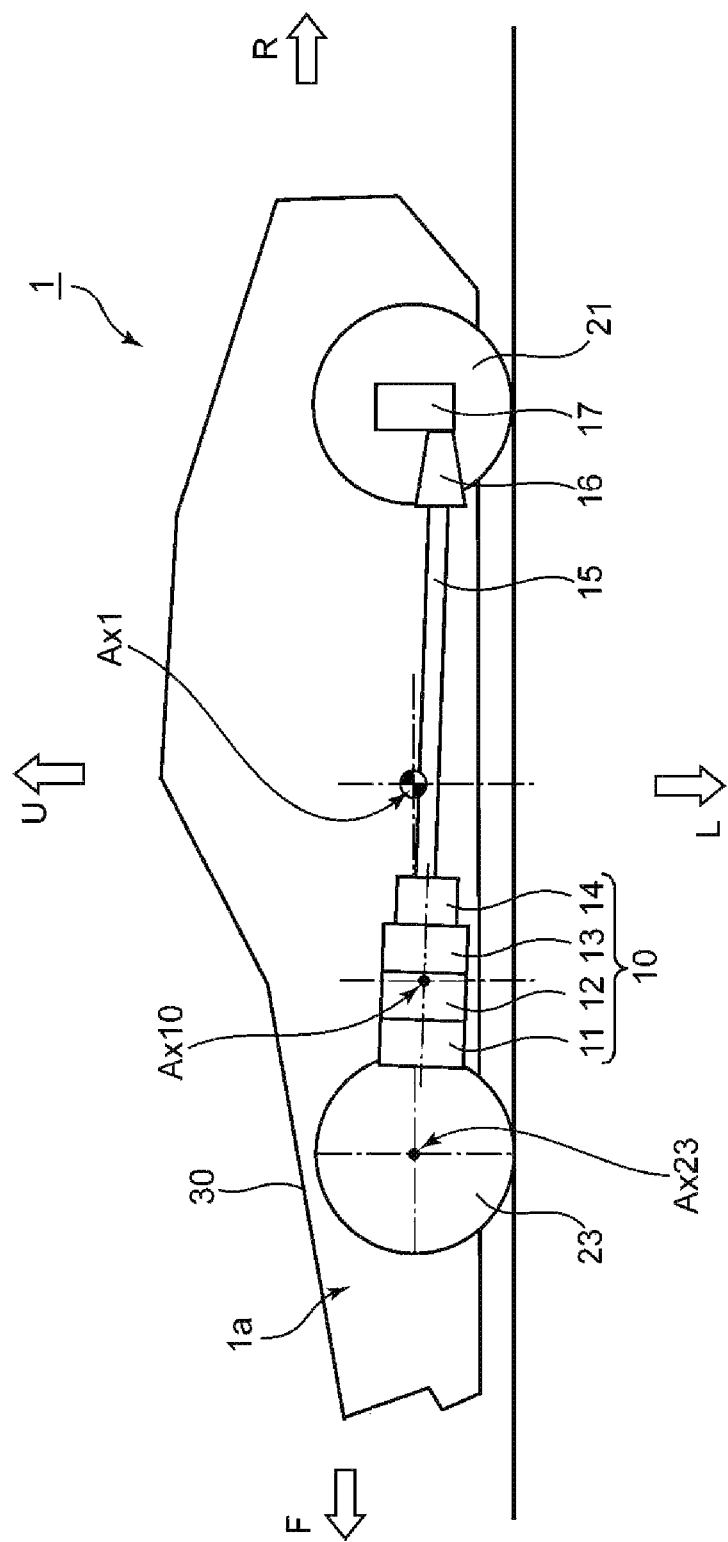
FIG. 2 is a schematic view illustrating a mounting position of a drive unit in the vehicle.

A description will be made on a mounting position of the drive unit 10 in the vehicle 1 with reference to FIG. 2.

As described above, in the vehicle 1, the drive unit 10 is mounted in the rear portion of the front area 1a. More specifically, the drive unit 10 is mounted such that a center of gravity Ax10 of the drive unit 10 is located behind a rotation center Ax23 of the front wheels 22, 23 (only the front wheel 23 is illustrated in FIG. 2). In addition, the drive unit 10 is mounted such that the center of gravity Ax10 thereof is located below the rotation center Ax23 of the front wheels 22, 23.

That is, in the vehicle 1, the drive unit 10 as a heavy object is made to be compact, and the drive unit 10 is thereby mounted in the rear portion of the front area 1a and in a lower portion having a clearance from a hood 30. In this way, a position Ax1 of center of gravity of the vehicle 1 can be set to a low position substantially at the center in a longitudinal direction of the vehicle 1.

3. Configurations of Drive Unit 10 and Peripheries

A description will be made on a detailed configuration of the drive unit 10 and configurations of peripheries thereof with reference to FIG. 3 to FIG. 6.

Figure 3:
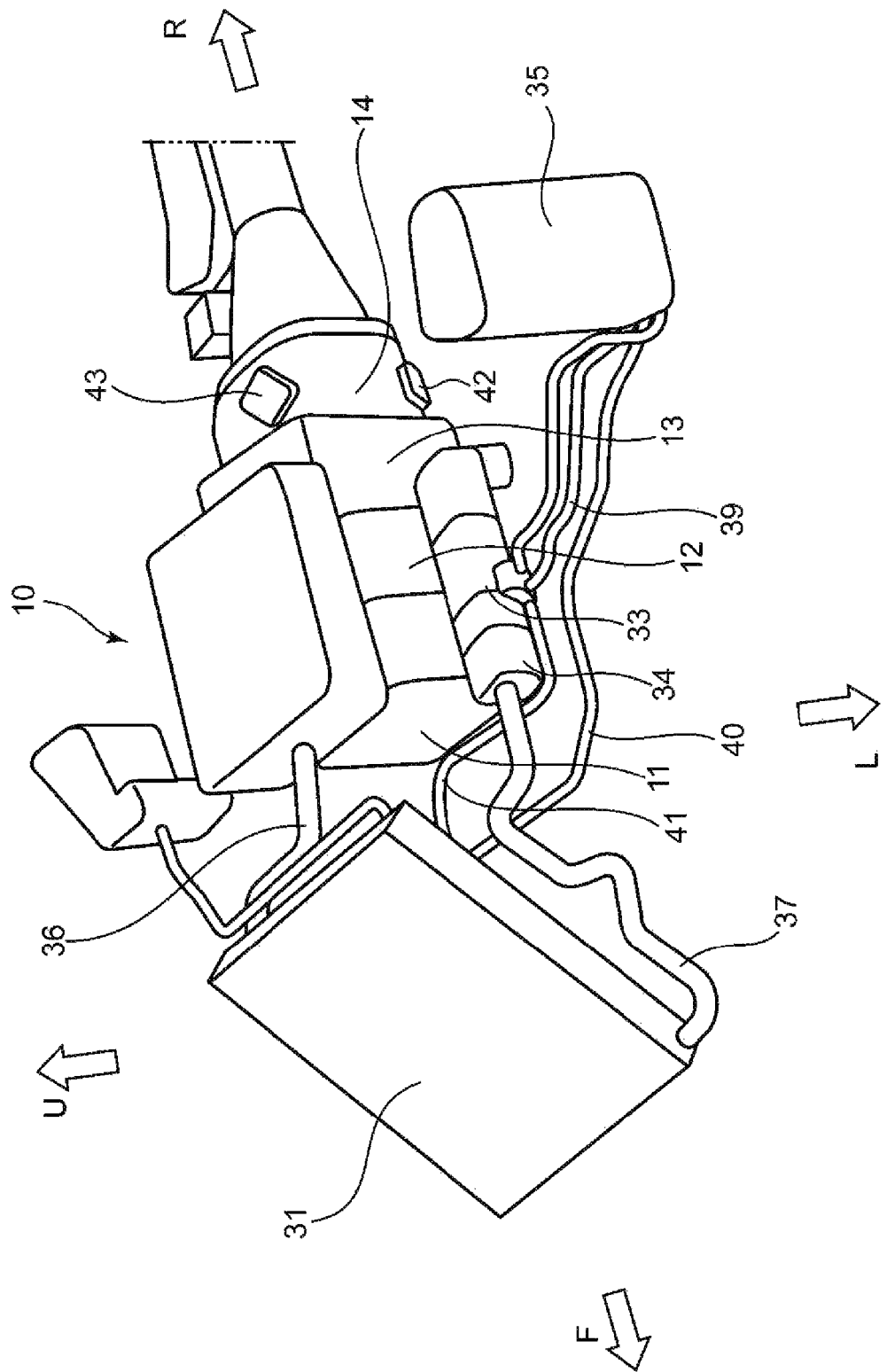
FIG. 3 is a perspective view illustrating a configuration of the drive unit.
Figure 4:
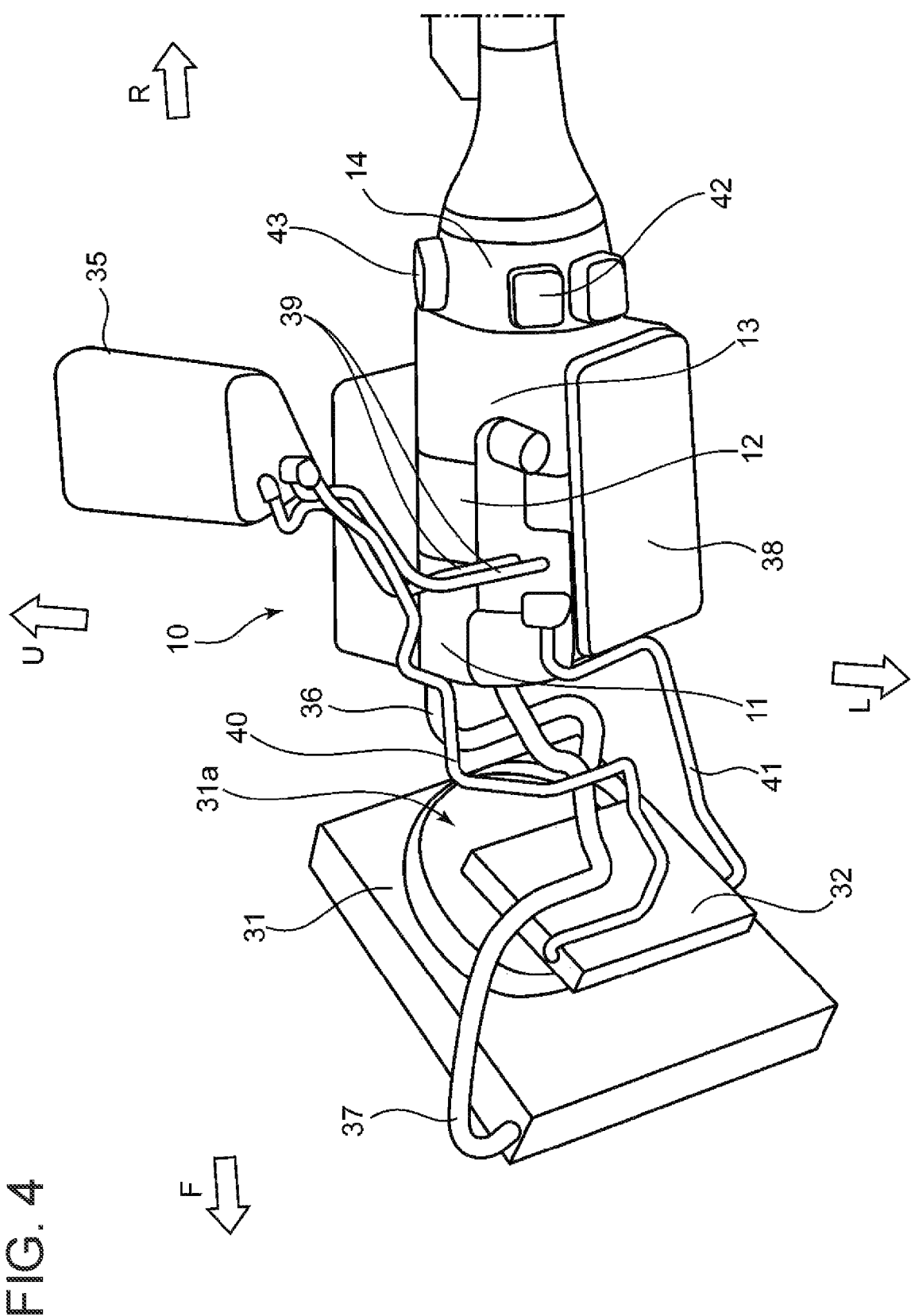
FIG. 4 is a perspective view illustrating the configuration of the drive unit.

As illustrated in FIG. 3 and FIG. 4, each of the engines 11 to 13 provided in the drive unit 10 is a rotary engine having a rotary piston as an example. The adoption of the rotary engines as the engines 11 to 13 in the vehicle 1 is beneficial for downsizing of the drive unit 10.

As illustrated in FIG. 4, an oil pan 38 is disposed below the engines 11 to 13. The oil pan 38 has a flat shape in which a dimension in a height direction is small in comparison with dimensions in a vehicle longitudinal direction and the vehicle width direction. This is beneficial to suppress a height of the drive unit 10 to be low.

As described above, in the vehicle 1 according to this embodiment, the oil pan 38 has the flat shape, and thus an accommodation volume of engine oil therein is low. For this reason, the oil pan 38 has a primary purpose of collecting the engine oil that has been distributed to the engines 11 to 13. Thus, an oil tank 35 is provided on a side of the drive unit 10 to store the engine oil collected in the oil pan 38.

As illustrated in FIG. 3 and FIG. 4, a radiator 31 and an oil cooler 32 are disposed in front of the drive unit 10. The radiator 31 is a device for cooling a coolant, a temperature of which has become high by heat from the engines 11 to 13, and has a radiator fan 31a on a rear side thereof.

The oil cooler 32 is arranged behind the radiator 31 and is disposed along the radiator 31. The oil cooler 32 is smaller in plane size than the radiator 31.

Pipes 36, 37 connect the engines 11 to 13 and the radiator 31. A water pump 34 is provided to a connection portion between the pipe 37 and each of the engines 11 to 13.

Each two of the oil cooler 32, the engines 11 to 13, the oil tank 35, and the oil pan 38 are connected by respective one of pipes 39 to 41 and the like. An oil pump 33 is provided to a connection portion between the pipe 41 and each of the engines 11 to 13.

The motor 14 in the drive unit 10 is arranged adjacent to a rear side of the engine 13. The engines 11 to 13 and the motor 14 have a direct-coupling structure to share an output shaft. In a vertical direction and the vehicle width direction of the vehicle 1, the motor 14 is formed to have a smaller external size than each of the engines 11 to 13.

Figure 6:
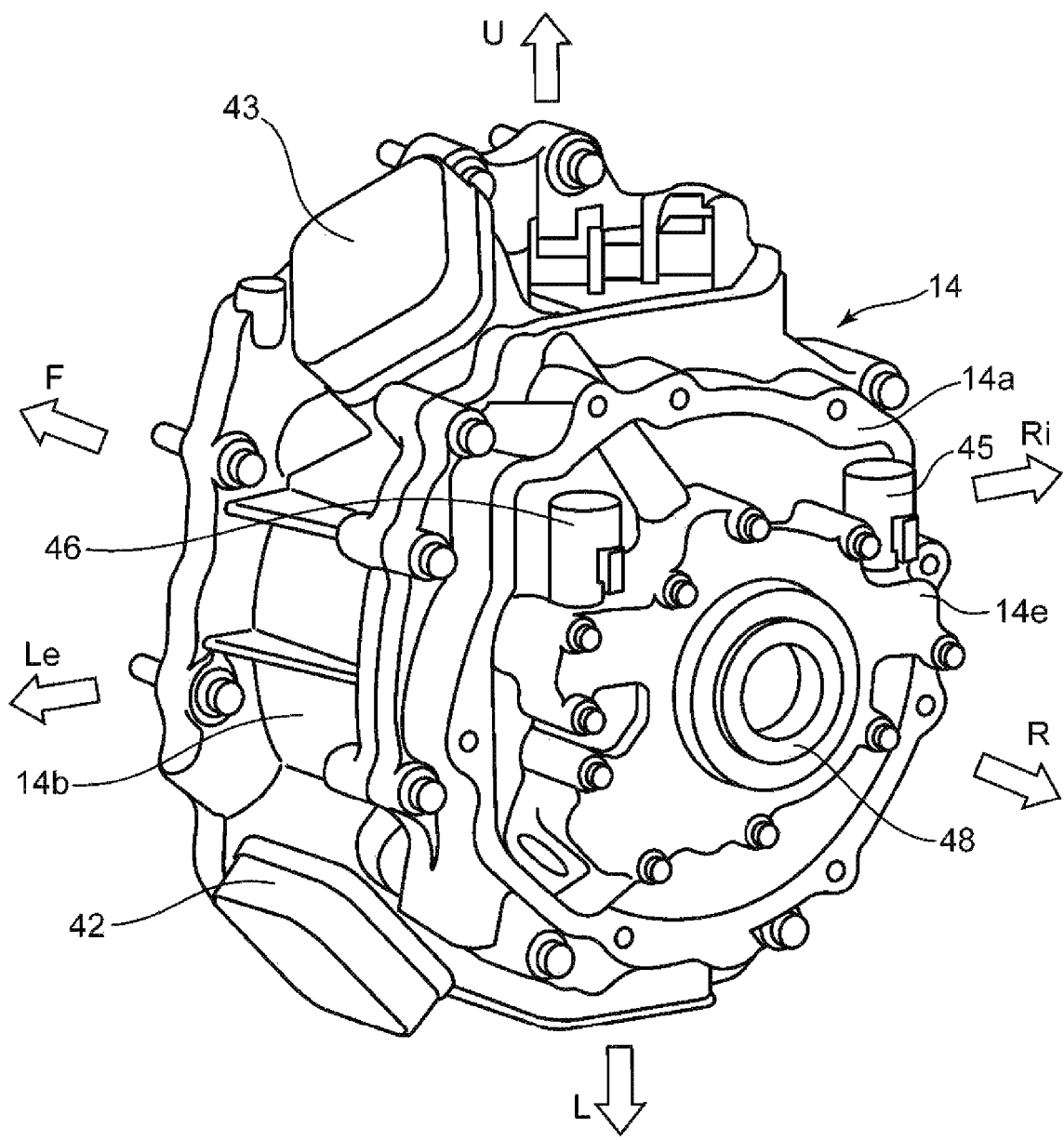
FIG. 6 is a perspective view illustrating arrangement of an oil control valve.

As illustrated in FIGS. 3, 4, and 6, two heat exchangers 42, 43 are attached to a side circumferential portion (a side housing 14b) of the motor 14. As illustrated in FIG. 6, when the drive unit 10 is seen from a rear side in the vehicle longitudinal direction, the heat exchangers 42, 43 are arranged on a left side of a driveshaft 48 of the drive unit 10.

In addition, the heat exchanger 43 is attached to the side housing 14b of the motor 14 in a state of being separated upward from the heat exchanger 42. In addition, the heat exchangers 42, 43 are arranged to be located in front of a rear housing 14a of the motor 14. In other words, the heat exchanger 42 and the heat exchanger 43 are arranged to be located on the side housing 14b of the motor 14 in the longitudinal direction of the vehicle 1.

In addition, as illustrated in FIG. 6 and the like, each of the heat exchanger 42 and the heat exchanger 43 has a flat external shape in which a height dimension is smaller than a length dimension and a width dimension. The adoption of the heat exchanger 42 and the heat exchanger 43, each of which has such a flat external shape, is beneficial to reduce size of a set configuration in which the heat exchangers 42, 43 are attached to the drive unit 10.

Figure 5:
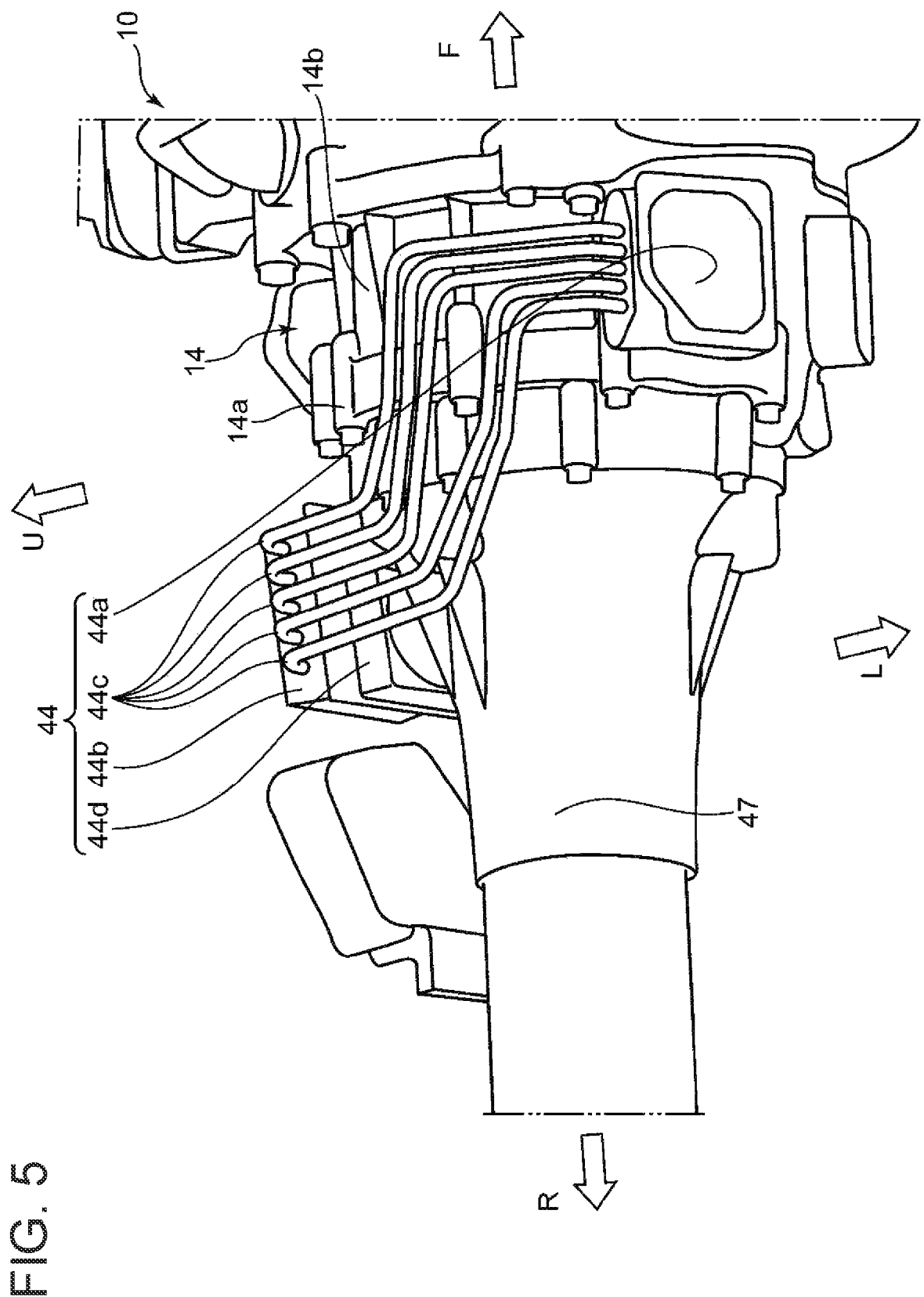
FIG. 5 is a perspective view illustrating arrangement of an ebullient cooler.

As illustrated in FIG. 5, an end surface on a rear end side of the rear housing 14a of the motor 14 is covered with a torque tube 47. The torque tube 47 is an example of a "cover member" in the present disclosure. An ebullient cooler 44 is provided in an area from the side housing 14b of the motor 14 to a front portion of the torque tube 47. The ebullient cooler 44 has an ebullient section 44a, a condensation section 44b, pipes 44c, and an ebullient cooler fan 44d. Each of the pipes 44c in the ebullient cooler 44 is filled with an ebullient cooling refrigerant, a boiling point of which is lower than that of oil for cooling the motor 14.

The ebullient section 44a is a section that is attached to the side housing 14b of the motor 14 for heat exchange between the ebullient cooling refrigerant and the oil for cooling the motor 14 (motor cooling oil).

The condensation section 44b is attached to the front portion of the torque tube 47, which is arranged behind the motor 14. The condensation section 44b is a section that condenses the ebullient cooling refrigerant boiled (evaporated) by the heat exchange in the ebullient section 44a. Each of the pipes 44c is a circulation path for the ebullient cooling refrigerant between the ebullient section 44a and the condensation section 44b. The ebullient cooler fan 44d is a section that promotes the condensation of the ebullient cooling refrigerant by blowing air to the condensation section 44b.

In the ebullient cooler 44, the ebullient cooler fan 44d is arranged adjacent to a lower portion of the condensation section 44*b*. The ebullient cooler fan 44*d* blows the air upward. Since the condensation section 44*b* and the ebullient cooler fan 44*d* in the ebullient cooler 44 are attached to the torque tube 47 behind the motor 14, it is possible to prevent the air that has flowed through the condensation section 44*b* and has been warmed from being blown again to the housings 14*a*, 14*b* of the motor 14. Thus, this is effective to maintain the motor 14 at an appropriate temperature.

As illustrated in FIG. 6, an outer housing of the motor 14 includes the rear housing 14*a*, the side housing 14*b*, and a back surface cover 14*e*. As described above, the two heat exchangers 42, 43 are attached to the side housing 14*b*.

Meanwhile, oil control valves 45, 46 are provided to a back surface side of the rear housing 14*a*. The oil control valves 45, 46 each are an example of a "switch unit" in the present disclosure. In detail, the oil control valve 45 is an example of a "first switch unit" in the present disclosure, and the oil control valve 46 is an example of a "second switch unit" in the present disclosure. A function played by each of the oil control valves 45, 46 will be described below. Each of the oil control valves 45, 46 is a part that switches a motor cooling oil path, through which the motor cooling oil flows, which will be described above.

In the vehicle 1 according to this embodiment, a part of a configuration of each of the oil control valves 45, 46 is disposed in the rear housing 14*a*, which is located inward from the back surface cover 14*e*. The entire motor cooling oil path is disposed in the rear housing 14*a*.

As described above, the end surface on the rear side of the rear housing 14*a* of the motor 14 is covered with the torque tube 47. In this way, the oil control valves 45, 46, including portions exposed to the outside from the rear housing 14*a*, are covered with the torque tube 47.

4. Cooling Configuration of Motor 14

A description will be made on a cooling configuration of the motor 14 in the drive unit 10 with reference to FIG. 7.

Figure 7:
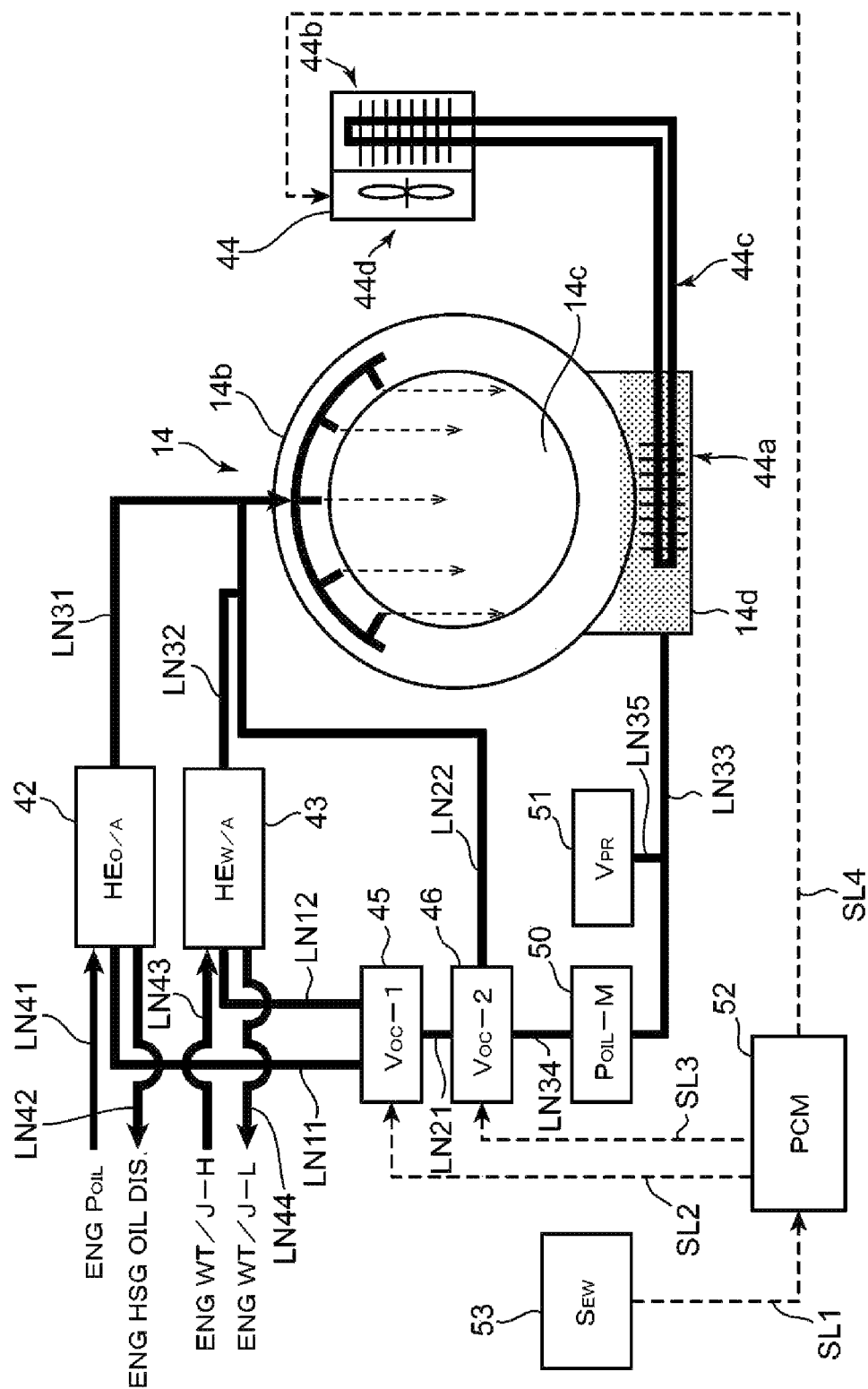
FIG. 7 is a schematic view illustrating a configuration related to cooling of a motor.

As illustrated in FIG. 7, the motor 14 has: the housings 14*a*, 14*b* and the back surface cover 14*e* (only the side housing 14*b* is illustrated in FIG. 7); a rotor-stator 14*c*; and an oil pan 14*d*. Motor cooling oil paths LN22, LN31, LN32 are connected to upper portions of the housings 14*a*, 14*b*. The motor cooling oil path LN31 is an example of a "first motor cooling path" in the present disclosure, and the motor cooling oil path LN32 is an example of a "second motor cooling path" in the present disclosure.

In the motor-drive mode, the motor cooling oil flows through any of the motor cooling oil paths LN22, LN31, LN32 to cool the rotor-stator 14*c* and then flows into the oil pan 14*d*. The motor cooling oil that has been received by the oil pan 14*d* is delivered to an oil pump 50 for the motor 14 through a motor cooling oil path LN33. A pressure-relief valve 51 is also connected to the motor cooling oil path LN33 via a motor cooling oil path LN35.

The motor cooling oil is delivered from the oil pump 50 to the oil control valve 46 through a motor cooling oil path LN34. The oil control valve 46 is a valve that switches the motor cooling oil delivery path to one of a motor cooling oil path LN21 and the motor cooling oil path LN22.

The motor cooling oil path LN21 is connected to the oil control valve 45. The oil control valve 45 is a valve that switches the motor cooling oil delivery path to one of a motor cooling oil path LN11 and a motor cooling oil path LN12.

The motor cooling oil path LN11 is an example of the "first motor cooling path" in the present disclosure, and the motor cooling oil path LN12 is an example of the "second motor cooling path" in the present disclosure. The motor cooling oil path LN11 is connected to the motor cooling oil path LN31 via the heat exchanger 42. The motor cooling oil path LN12 is connected to the motor cooling oil path LN32 via the heat exchanger 43.

In an engine oil circulation path, the engine oil that is pumped out of the oil pump 33 flows from an engine cooling oil path LN41 to an engine cooling oil path LN42 via the heat exchanger 42. The engine oil that has flowed into the engine cooling oil path LN42 through the heat exchanger 42 is delivered to an eccentric shaft. Then, the engine oil lubricates and cools a rotor.

In addition, a portion of the engine oil that has flowed into the engine cooling oil path LN42 is injected into a combustion chamber of each of the engines 11 to 13 to lubricate and cool a housing, an apex seal, and a side seal.

In the heat exchanger 42, the motor cooling oil and the engine oil can exchange the heat. That is, in the motor-drive mode, heat generated in the motor 14 can be transferred to the engine oil so as to be able to cool the motor 14 and can thereby increase a temperature of the engine oil. Thus, in the vehicle 1, in the motor-drive mode, the engine oil circulation path can be shared to cool the motor 14, and each of the engines 11 to 13 in a state where the fuel is not supplied to the combustion chamber can be warmed. Thus, it is possible to downsize the cooling system for the drive unit 10 and to improve engine efficiency at the time of shifting to the engine-drive mode.

In the coolant circulation path for the engines 11 to 13, the coolant that has flowed out of a high-pressure water jacket in each of the engines 11 to 13 flows from an engine coolant path LN43 to an engine coolant path LN44 via the heat exchanger 43. The coolant that has flowed into the engine coolant path LN44 through the heat exchanger 43 is introduced into a low-pressure water jacket in each of the engines 11 to 13.

In the heat exchanger 43, the motor cooling oil and the coolant for cooling the engine can exchange the heat. Also, in this way, in the motor-drive mode, the heat generated in the motor 14 can be transferred to the coolant so as to be able to cool the motor 14 and can thereby increase a temperature of the coolant. Thus, it is possible to downsize the cooling system for the drive unit 10 and to improve the engine efficiency at the time of shifting to the engine-drive mode. In the case where a cooling system for transferring the heat of the motor cooling oil to the coolant is used for the heat exchanger 43 (cooling by using the second motor cooling path), a higher cooling performance can be achieved than a case where a cooling system for transferring the heat of the motor cooling oil to the engine oil is used for the heat exchanger 42 (cooling by using the first motor cooling path). This is because the radiator 31 for cooling the coolant is larger than the oil cooler 32 and also because the radiator 31 has the radiator fan 31*a*.

The ebullient section 44*a* of the ebullient cooler 44 is disposed in the oil pan 14*d* of the motor 14. Here, as it has been described with reference to FIG. 5, an outer housing of the ebullient section 44*a* is attached to the side housing 14*b* of the motor 14, and the ebullient cooling refrigerant, with which the pipes 44*c* are filled, can exchange the heat with the motor cooling oil in the oil pan 14*d*.

The vehicle 1 also includes a valve control unit 52 and an engine coolant temperature sensor 53. The engine coolant temperature sensor 53 is, for example, provided to a pipe 36 between the engine 13 and the radiator 31. The valve control unit 52 is an example of a "controller" in the present disclosure and is configured to include a microcomputer having a processor (i.e., a central processing unit (CPU), memory (i.e., ROM and/or RAM), and the like. The valve control unit 52 is connected to the engine coolant temperature sensor 53 by a signal line SL1, is connected to the oil control valves 45, 46 by signal lines SL2, SL3, respectively, and is connected to the ebullient cooler fan 44d of the ebullient cooler 44 by a signal line SL4.

5. Cooling Control Method for Motor 14 Executed by Valve Control Unit 52

In the motor-drive mode (in the case where the vehicle 1 travels by the drive power of the motor 14), the valve control unit 52 executes switching control of the oil control valves 45, 46 and drive control of the ebullient cooler fan 44d on the basis of information on an engine coolant temperature from the engine coolant temperature sensor 53. More specifically, the valve control unit 52 executes the control as follows.

(1) In the Case where Engine Coolant Temperature is Lower than a First Threshold In the case where the valve control unit 52 determines that the engine coolant temperature is lower than the first threshold, the valve control unit 52 executes the switching control of the oil control valve 46 so as to connect the motor cooling oil path LN34 and the motor cooling oil path LN21, and executes the switching control of the oil control valve 45 so as to connect the motor cooling oil path LN21 and the motor cooling oil path LN11. In this embodiment, the first threshold is 40° C., for example.

In the case where the engine coolant temperature is lower than the first threshold, the motor cooling oil, which has been pumped out of the oil pump 50, flows through the motor cooling oil paths LN34, LN21, LN11, LN31 and is introduced into the motor 14. Then, in the heat exchanger 42, the motor cooling oil and the engine oil exchange heat. In this way, the heat of the motor cooling oil is transferred to the engine oil. As a result, the motor 14 is cooled, and the temperature of each of the engines 11 to 13 in the state where the fuel is not supplied to the combustion chamber can be increased. Therefore, the engines 11 to 13 can be warmed while the motor 14 is maintained at the appropriate temperature.

(2) In the Case where Engine Coolant Temperature is Equal to or Higher than the First Threshold and Lower than a Second Threshold In the case where the valve control unit 52 determines that the engine coolant temperature is equal to or higher than the first threshold and is lower than a second threshold, the valve control unit 52 executes the switching control of the oil control valve 46 so as to connect the motor cooling oil path LN34 and the motor cooling oil path LN21, and executes the switching control of the oil control valve 45 so as to connect the motor cooling oil path LN21 and the motor cooling oil path LN12. In this embodiment, the second threshold is 80° C., for example.

In the case where the engine coolant temperature is equal to or higher than the first threshold and is lower than the second threshold, the motor cooling oil, which has been pumped out of the oil pump 50, flows through the motor cooling oil paths LN34, LN21, LN12, LN32 and is introduced into the motor 14. Then, in the heat exchanger 43, the motor cooling oil and the coolant exchange heat.

In addition, in the case where the engine coolant temperature is equal to or higher than the first threshold, the ebullient cooler fan 44d of the ebullient cooler 44 receives a command from the valve control unit 52 and is driven.

As it has been described so far, in the motor-drive mode, it is possible to dissipate the heat generated in the motor 14 via the coolant for the engines 11 to 13 and from the ebullient cooler 44. In addition, in the case where the engine coolant temperature is equal to or higher than the first threshold and is lower than the second threshold, the engines 11 to 13, in each of which the fuel is not supplied to the combustion chamber, can be warmed.

(3) In the Case where Engine Coolant Temperature is Equal to or Higher than the Second Threshold In the case where the valve control unit 52 determines that the engine coolant temperature is equal to or higher than the second threshold, the valve control unit 52 executes the switching control of the oil control valve 46 so as to connect the motor cooling oil path LN34 and the motor cooling oil path LN22. Similar to the case where the engine coolant temperature is equal to or higher than the first threshold and is lower than the second threshold, the ebullient cooler fan 44d of the ebullient cooler 44 is driven.

As it has been described so far, in the case where the engine coolant temperature is equal to or higher than the second threshold, the motor cooling oil, which has been pumped out of the oil pump 50, flows through the motor cooling oil paths LN34, LN22 and is introduced into the motor 14. Then, in the case where the engine coolant temperature is equal to or higher than the second threshold, the motor cooling oil does not exchange the heat with the coolant and the engine oil.

During the travel of the vehicle 1 by using the drive power of the motor 14, in the case where the engine coolant temperature is equal to or higher than the second threshold, it is possible to dissipate the heat generated in the motor 14 via the ebullient cooler 44.

6. Oil Control Valves 45, 46 Provided in Housings 14a, 14b of Motor 14

Figure 8:
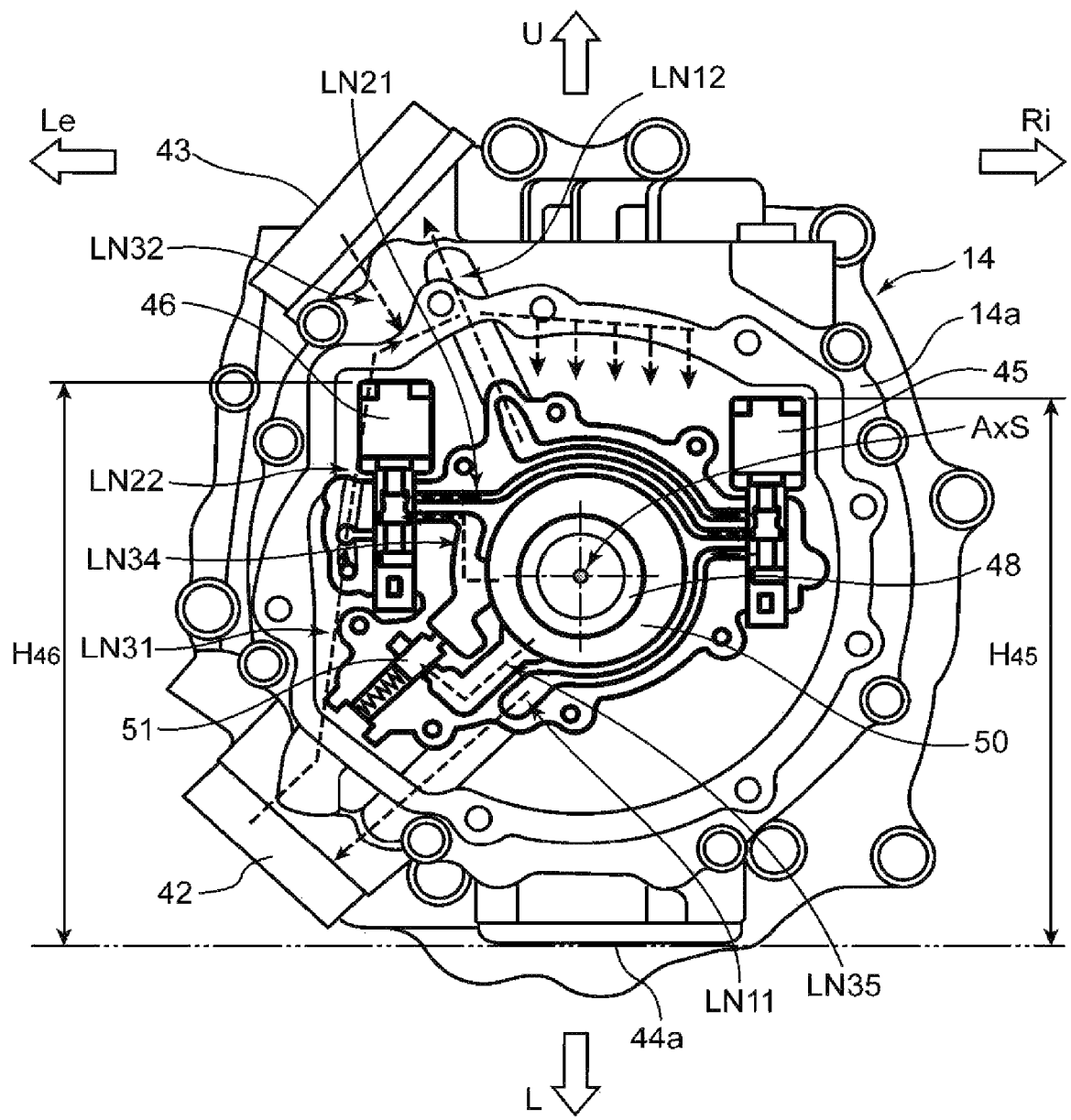
FIG. 8 is a back view (a partially cut cross-sectional view) illustrating an oil path in a housing of the motor.

A description will be made on the oil control valves 45, 46 and the oil paths provided in the housings 14a, 14b of the motor 14 with reference to FIG. 8 and FIG. 9. FIG. 8 illustrates a cross section in which the torque tube 47 and the back surface cover 14e of the motor 14 are removed and the rear housing 14a and the like are partially cut out.

As illustrated in FIG. 8, the motor cooling oil paths LN11, LN12, LN21, LN22, LN31 to LN35 (the motor cooling oil path LN33 is not illustrated), through each of which the motor cooling oil flows, are provided in the housings 14a, 14b of the motor 14. In addition, in regard to the oil control valves 45, 46, spool portions thereof for actually switching the oil path are provided in the housings 14a, 14b of the motor 14.

As illustrated in FIG. 8, when the motor 14 is seen from the rear side in the vehicle longitudinal direction of the vehicle 1, the oil control valves 45, 46 are arranged above a center axis AxS of the output shaft 48. The oil control valve 45 is arranged on a right side in the vehicle width direction from the center axis AxS of the output shaft 48, and the oil control valve 46 is arranged on a left side in the vehicle width direction from the center axis AxS of the output shaft 48.

The motor cooling oil path LN34 is connected from the oil pump 50 to the oil control valve 46, which is arranged on the left side in the vehicle width direction. In addition, the motor cooling oil path LN35 is connected to the pressure-relief valve 51 that is arranged below the oil control valve 46. Here, the pressure-relief valve 51 is arranged to have an inclined posture with which an outer end (a lower end) thereof does not face directly downward but faces diagonally downward to the left. This is to prevent interference between the oil pan 14d (see FIG. 7) provided in the lower portion of the motor 14 and the ebullient section 44a of the ebullient cooler 44.

A height $H_{46}$ of the oil control valve 46 with a lower side of the motor 14 being a point of origin is set to be higher than a height $H_{45}$ of the oil control valve 45. This is to avoid the interference with the pressure-relief valve 51 arranged below the oil control valve 46.

Figure 9:
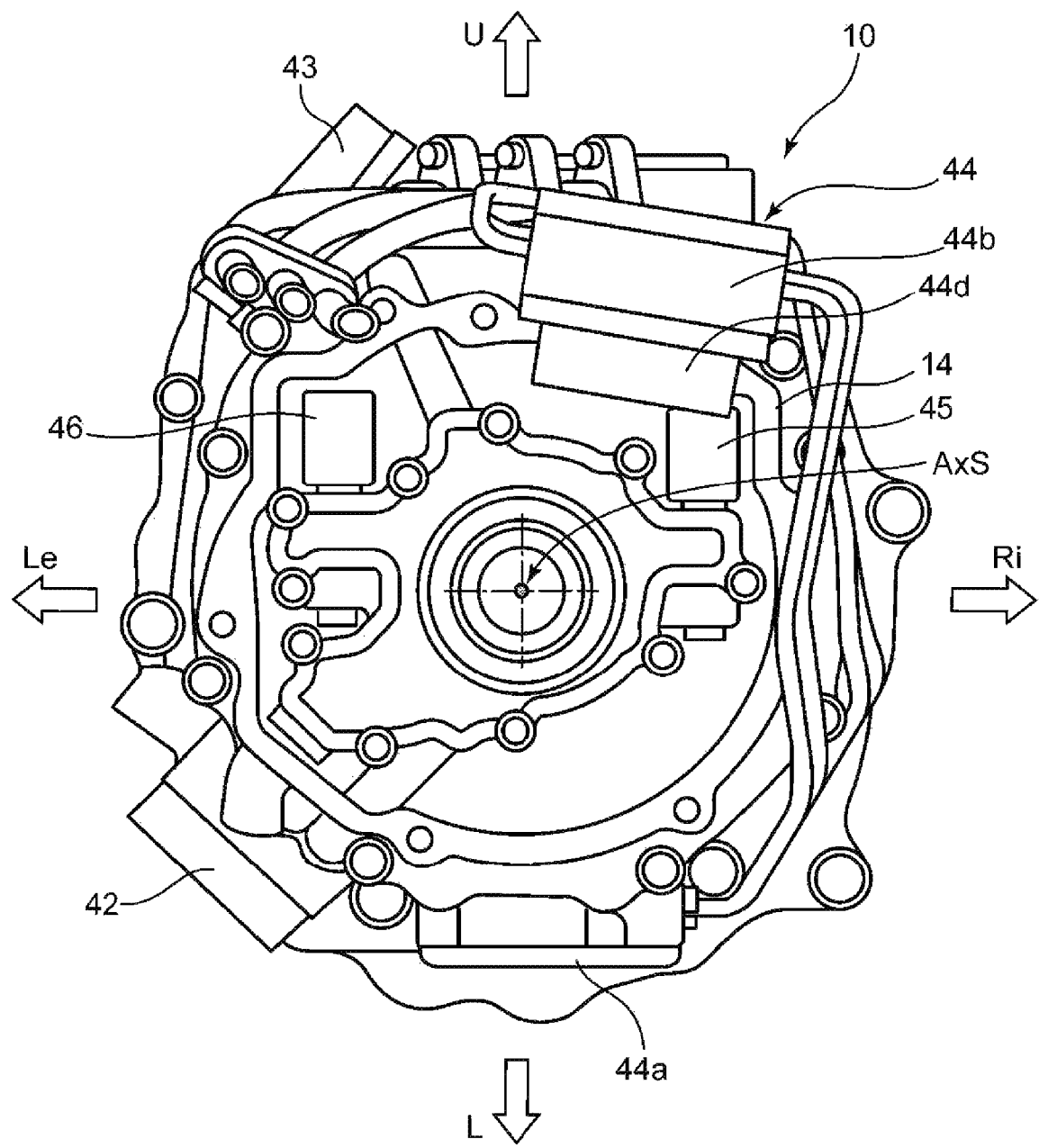
FIG. 9 is a back view illustrating a positional relationship between the oil control valve and each section of the ebullient cooler.

Meanwhile, a reason why the height $H_{45}$ of the oil control valve 45 is set to be lower than the height $H_{46}$ of the oil control valve 46 is, as illustrated in FIG. 9, to suppress interference with the condensation section 44b and the ebullient cooler fan 44d of the ebullient cooler 44, which are arranged rearward and upward.

Referring back to FIG. 8, the motor cooling oil path LN21 is connected to the oil control valve 46. The motor cooling oil path LN21 is formed to be curved on an upper outer circumference of the output shaft 48. The motor cooling oil path LN21 is connected to the oil control valve 45.

The motor cooling oil path LN22 is also connected to the oil control valve 46. The other end of the motor cooling oil path LN22 is connected to the housings 14a, 14b of the motor 14 such that the motor cooling oil can flow through the rotor-stator 14c accommodated in the housings 14a, 14b.

The motor cooling oil path LN11 and the motor cooling oil path LN12 are connected to the oil control valve 45. The motor cooling oil path LN11 is formed to be curved on a lower outer circumference of the output shaft 48. The other end of the motor cooling oil path LN11 is connected to the heat exchanger 42. The motor cooling oil path LN12 is further formed to be curved on an upper outer circumference of the motor cooling oil path LN21. The other end of the motor cooling oil path LN12 is connected to the heat exchanger 43.

One end of the motor cooling oil path LN31 is connected to the heat exchanger 42, and the other end thereof is connected to the motor cooling oil path LN22. The motor cooling oil, which has flowed through the heat exchanger 42, flows from the motor cooling oil path LN31 into the housings 14a, 14b of the motor 14 via the motor cooling oil path LN22.

One end of the motor cooling oil path LN32 is connected to the heat exchanger 43, and the other end thereof is connected to the motor cooling oil path LN22. The motor cooling oil, which has flowed through the heat exchanger 43, flows from the motor cooling oil path LN32 into the housings 14a, 14b of the motor 14 via the motor cooling oil path LN22.

As it has been described so far, in the vehicle 1 according to this embodiment, the oil control valves 45, 46 and the motor cooling oil paths LN11, LN12, LN21, LN22, LN31 to LN35 are provided in the housings 14a, 14b of the motor 14. In this way, compared to the case where these oil control valves 45, 46 and motor cooling oil paths LN11, LN12, LN21, LN22, LN31 to LN35 are provided on the outside of the housings 14a, 14b, it is possible to downsize the set configuration including the drive unit 10, the oil control valves 45, 46, the motor cooling oil paths LN11, LN12, LN21, LN22, LN31 to LN35, and the like.

MODIFIED EXAMPLES

In the above embodiment, the motor cooling oil path is switched by using the two oil control valves 45, 46. However, the present invention is not limited thereto. For example, it may be configured that the path is switched by using one valve or may be configured that the path is switched by using three or more valves.

In the above embodiment, a spool valve is adopted as an example of the switch unit for the motor cooling oil path. However, the present invention is not limited thereto. For example, a poppet valve or a slide valve can be adopted therefor.

Furthermore, a thermostat or the like can be used as the switch unit for the motor cooling path.

In the above embodiment, the drive unit, which is configured to include the three engines 11 to 13 and the single motor 14, is adopted. However, the present invention is not limited thereto. For example, a drive unit configured to include a single engine and a single motor or a drive unit configured to include a plurality of engines and a plurality of motors can be adopted.

In the above embodiment, the oil is adopted as an example of the motor cooling refrigerant. However, the present invention is not limited thereto. For example, the coolant or the like can be used.

In the above embodiment, each of the engines 11 to 13 is the rotary engine. However, a reciprocating engine can be adopted for the present invention. Here, in the vehicle 1 according to the above embodiment, for which the rotary engine is adopted, the drive unit 10 can be made to be compact. This is beneficial to achieve the higher vehicle motion performance.

In the above embodiment, the configuration that each of the oil control valves 45, 46 is partially exposed to the outside of the housings 14a, 14b of the motor 14. However, the present invention is not limited thereto. The entire configuration of the switch unit may be provided in the housing of the drive unit.

In the above embodiment, the oil cooler 32 does not include a cooling fan. However, the present invention is not limited thereto. The oil cooler can include the cooling fan or can be added with a mechanism capable of spraying misty water onto a fin of the oil cooler.

In the above embodiment, an FR (front engine, rear-wheel drive) vehicle is adopted as an example of the vehicle 1. However, the present invention is not limited thereto. For example, an RR (rear engine, rear-wheel drive) vehicle, in which the drive unit is mounted in a rear portion and transmits the drive power to rear wheels, an MR (mid-engine, rear-wheel drive) vehicle, in which the drive unit is mounted to a position behind a driver's seat to transmit the drive power to rear wheels, or further an FF (front engine, front-wheel drive) vehicle, in which the drive unit is mounted to a rear portion of a front area to transmit the drive power to front wheels, can be adopted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1 vehicle
10 drive unit
11 to 13 engine
14 motor
14a rear housing (housing)

14b side housing (housing)
26 battery
29 drive mode control unit
31 radiator
32 oil cooler
42, 43 heat exchanger
44 ebullient cooler
44a ebullient section
44b condensation section
44d ebullient cooler fan
45 oil control valve (first switch unit)
46 oil control valve (second switch unit)
47 torque tube (cover member)
48 output shaft
51 pressure-relief valve
52 valve control unit (controller)
53 engine coolant temperature sensor
LN11, LN31 motor cooling oil path (first motor cooling path)
LN12, LN32 motor cooling oil path (second motor cooling path)

The invention claimed is:

1. A vehicle, comprising:
a drive unit that is a drive source for travel of the vehicle and includes an engine and a motor arranged adjacent to each other;
a motor cooling path that is connected to the motor and is a path of a refrigerant for cooling the motor and that includes:
 a first motor cooling path; and
 a second motor cooling path, a cooling performance of which by the refrigerant is higher than that of the first motor cooling path; and
a switch unit that is connected to both of the first motor cooling path and the second motor cooling path and switches between cooling of the motor by causing the refrigerant to flow through the first motor cooling path and cooling of the motor by causing the refrigerant to flow through the second motor cooling path, wherein
the motor includes a housing that accommodates a rotor-and-stator for outputting rotary power, and
at least a part of the switch unit and the motor cooling path are provided in the housing.

2. The vehicle according to claim 1, wherein
the refrigerant is oil, and
the switch unit is a switch valve.

3. The vehicle according to claim 2, wherein
in the drive unit, the motor is arranged adjacent to a rear side of the engine in a longitudinal direction of the vehicle,
an output shaft of the drive unit is formed to extend from the engine toward the rear side,
the switch unit includes a first switch unit and a second switch unit, and
the first switch unit and the second switch unit are arranged above an axis of the output shaft of the drive unit in a vertical direction of the vehicle in a state of being separated to right and left in a vehicle width direction of the vehicle.

4. The vehicle according to claim 3, wherein
the first switch unit and the second switch unit are arranged at different height positions in the vertical direction of the vehicle.

5. The vehicle according to claim 4, wherein
when the engine, the first switch unit, and the second switch unit are seen from the rear side, the first switch unit and the second switch unit are arranged on an inner side of an outer circumference of the engine.

6. The vehicle according to claim 5, further comprising:
an ebullient cooler including:
 a circulation path for circulating an ebullient cooling refrigerant, a boiling point of which is lower than that of the refrigerant flowing through the motor cooling path;
 an ebullient section that is disposed in the middle of the circulation path and in which the refrigerant and the ebullient cooling refrigerant exchange heat; and
 a condensation section that condenses the ebullient cooling refrigerant.

7. The vehicle according to claim 6, wherein
the condensation section in the ebullient cooler is arranged adjacent to a rear side of the motor in the longitudinal direction of the vehicle.

8. The vehicle according to claim 7, further comprising:
an engine oil path as a path of engine oil for cooling the engine;
a coolant path as a path of a coolant for cooling the engine;
a first heat exchanger by which the engine oil flowing through the engine oil path and the refrigerant flowing through the first motor cooling path exchange heat; and
a second heat exchanger by which the coolant flowing through the coolant path and the refrigerant flowing through the second motor cooling path exchanging the heat.

9. The vehicle according to claim 8, further comprising:
an engine coolant temperature sensor for detecting a temperature of the engine; and
a controller for controlling the switch unit on the basis of the temperature of the engine.

10. The vehicle according to claim 9, wherein
an end surface of the housing of the motor in an adjacent direction of the engine and the motor is covered with a cover member.

11. The vehicle according to claim 1, wherein
in the drive unit, the motor is arranged adjacent to a rear side of the engine in a longitudinal direction of the vehicle,
an output shaft of the drive unit is formed to extend from the engine toward the rear side,
the switch unit includes a first switch unit and a second switch unit, and
the first switch unit and the second switch unit are arranged above an axis of the output shaft of the drive unit in a vertical direction of the vehicle in a state of being separated to right and left in a vehicle width direction of the vehicle.

12. The vehicle according to claim 11, wherein
the first switch unit and the second switch unit are arranged at different height positions in the vertical direction of the vehicle.

13. The vehicle according to claim 12, wherein
when the engine, the first switch unit, and the second switch unit are seen from the rear side, the first switch unit and the second switch unit are arranged on an inner side of an outer circumference of the engine.

14. The vehicle according to claim 11, wherein
when the engine, the first switch unit, and the second switch unit are seen from the rear side, the first switch unit and the second switch unit are arranged on an inner side of an outer circumference of the engine.

15. The vehicle according to claim 1, further comprising:
an ebullient cooler including:

a circulation path for circulating an ebullient cooling refrigerant, a boiling point of which is lower than that of the refrigerant flowing through the motor cooling path;

an ebullient section that is disposed in the middle of the circulation path and in which the refrigerant and the ebullient cooling refrigerant exchange heat; and a condensation section that condenses the ebullient cooling refrigerant.

16. The vehicle according to claim 15, wherein the condensation section in the ebullient cooler is arranged adjacent to a rear side of the motor in the longitudinal direction of the vehicle.

17. The vehicle according to claim 1, further comprising:

an engine oil path as a path of engine oil for cooling the engine;

a coolant path as a path of a coolant for cooling the engine;

a first heat exchanger by which the engine oil flowing through the engine oil path and the refrigerant flowing through the first motor cooling path exchange heat; and a second heat exchanger by which the coolant flowing through the coolant path and the refrigerant flowing through the second motor cooling path exchanging the heat.

18. The vehicle according to claim 17, further comprising:

an engine coolant temperature sensor for detecting a temperature of the engine; and a controller for controlling the switch unit on the basis of the temperature of the engine.

19. The vehicle according to claim 1, wherein an end surface of the housing of the motor in an adjacent direction of the engine and the motor is covered with a cover member.

20. The vehicle according to claim 1, wherein the motor provided in the drive unit is arranged adjacent to a rear side of the engine, and the engine and the motor have a direct-coupling structure to share an output shaft.

* * * * *